United States Patent
Dikvall et al.

(10) Patent No.: US 9,582,412 B2
(45) Date of Patent: *Feb. 28, 2017

(54) METHOD AND ARRANGEMENT FOR RECORDING A MEDIA STREAM

(75) Inventors: Henrik Dikvall, Vaxholm (SE); Per Cronvall, Upplands Väsby (SE)

(73) Assignee: SAAB AB, Linkoeping (SE)

( * ) Notice: Subject to any disclaimer, the term of this patent is extended or adjusted under 35 U.S.C. 154(b) by 496 days.

This patent is subject to a terminal disclaimer.

(21) Appl. No.: 13/702,290
(22) PCT Filed: Jun. 21, 2010
(86) PCT No.: PCT/SE2010/050705
§ 371 (c)(1),
(2), (4) Date: Feb. 8, 2013
(87) PCT Pub. No.: WO2011/162648
PCT Pub. Date: Dec. 29, 2011

(65) Prior Publication Data
US 2013/0205107 A1 Aug. 8, 2013

(51) Int. Cl.
*G06F 9/50* (2006.01)
*G06F 12/00* (2006.01)
(Continued)

(52) U.S. Cl.
CPC .............. *G06F 12/02* (2013.01); *G06T 1/60* (2013.01); *H04N 19/132* (2014.11);
(Continued)

(58) Field of Classification Search
CPC ......... G06F 17/30038; G06F 17/30056; G06F 17/30017; G06F 12/02; G06F 19/16;
(Continued)

(56) References Cited

U.S. PATENT DOCUMENTS 4,999,715 A * 3/1991 Porcellio et al. ........ 358/426.01
5,608,539 A   3/1997 Sakamoto
(Continued)

FOREIGN PATENT DOCUMENTS

EP   1134968 A2   9/2001
EP   1158764 A2   11/2001
(Continued)

OTHER PUBLICATIONS

Skodras, Athanassios, et al., "The JPEG 2000 Still Image Compression Standard," *IEEE Signal Processing Magazine*, Sep. 2001, pp. 36-58, IEEE, New York.
(Continued)

*Primary Examiner* — Matthew Bradley
*Assistant Examiner* — Candice Rankin
(74) *Attorney, Agent, or Firm* — Alston & Bird LLP (57) ABSTRACT

The present invention relates to the field of digital media recording such as video or audio, where compression is used to reduce the amount of data to save onto a data storage. In particular the invention relates to recording media, wherein the memory area required to store the media is unknown. The invention discloses a method for recording digital streamed media with a number of media frames in a memory by encoding each media frame into an encoded frame comprising a first number of sets of data, representing different characteristics of the media stream. The invention further relates to detecting if the data storage is full and if the data storage is full, storing new frames in the data storage previously occupied by the data sets representing the least prioritized characteristics of the previously stored encoded frames. The invention also relates to a corresponding media recorder and computer program.

22 Claims, 9 Drawing Sheets

(51) Int. Cl.

| | | |
|---|---|---|
| *G06K 9/36* | (2006.01) | |
| *G06F 12/02* | (2006.01) | |
| *G06T 1/60* | (2006.01) | |
| *H04N 19/37* | (2014.01) | |
| *H04N 19/132* | (2014.01) | |
| *H04N 19/186* | (2014.01) | |
| *H04N 19/156* | (2014.01) | |
| *H04N 19/187* | (2014.01) | |
| *H04N 19/167* | (2014.01) | |
| *H04N 19/33* | (2014.01) | |
| *H04N 19/423* | (2014.01) | |
| *H04N 19/63* | (2014.01) | |
| *H04N 19/162* | (2014.01) | |

(52) U.S. Cl.
CPC ......... *H04N 19/156* (2014.11); *H04N 19/167* (2014.11); *H04N 19/186* (2014.11); *H04N 19/187* (2014.11); *H04N 19/33* (2014.11); *H04N 19/37* (2014.11); *H04N 19/423* (2014.11); *H04N 19/162* (2014.11); *H04N 19/63* (2014.11)

(58) Field of Classification Search
CPC ............... G06F 21/552; G06F 9/30149; G06F 9/30152; G06F 9/382; G06F 11/1402; G06F 17/30153; G06F 9/50; G06F 12/00; H04N 19/40; H04N 21/4334; H04N 21/4405; H04N 21/2747; H04N 21/4223; H04N 13/0497; H04N 21/234; H04N 21/2347; H04N 21/233; H04N 21/23418; H04N 21/42607; H04N 21/439; H04N 21/44; H04N 21/2187; H04N 21/4318; H04N 21/234363; H04L 65/608; H04L 65/607; G06K 9/36

See application file for complete search history.

(56) References Cited

U.S. PATENT DOCUMENTS

| | | | | |
|---|---|---|---|---|
| 6,246,797 | B1* | 6/2001 | Castor et al. | 382/232 |
| 7,751,628 | B1 | 7/2010 | Reisman | |
| 8,423,731 | B1* | 4/2013 | Nadathur et al. | 711/162 |
| 2002/0071656 | A1* | 6/2002 | Boys | G11B 27/028 386/241 |
| 2002/0191951 | A1 | 12/2002 | Sodeyama et al. | |
| 2008/0170130 | A1* | 7/2008 | Ollila | H04N 5/2252 348/211.99 |
| 2008/0317431 | A1 | 12/2008 | Mishima et al. | |
| 2009/0116507 | A1* | 5/2009 | Kanda | 370/464 |
| 2009/0210707 | A1* | 8/2009 | De Lutiis | H04L 63/123 713/170 |
| 2009/0313484 | A1* | 12/2009 | Millet et al. | 713/300 |
| 2010/0091801 | A1* | 4/2010 | Itakura et al. | 370/475 |
| 2010/0324910 | A1* | 12/2010 | Chambers et al. | 704/270.1 |
| 2011/0208872 | A1* | 8/2011 | Liddell | G06F 9/505 709/231 |

FOREIGN PATENT DOCUMENTS

| | | |
|---|---|---|
| EP | 1395035 A1 | 3/2004 |
| WO | WO 01/37209 A1 | 5/2001 |

OTHER PUBLICATIONS

International Searching Authority, "International Search Report," for International Application No. PCT/SE2010/050705, mailed Mar. 4, 2011, 5 pages, Swedish Patent and Registration Office, Stockholm.

International Preliminary Examining Authority, "International Preliminary Report on Patentability" for International Application No. PCT/SE2010/050705, including Applicant's Apr. 23, 2012 Response to the Written Opinion, dated Oct. 9, 2012, 19 pages, Swedish Patent and Registration Office, Stockholm.

International Searching Authority, "International Search Report—Corrected," for International Application No. PCT/SE2010/050704, mailed Mar. 4, 2011, 5 pages, Swedish Patent and Registration Office, Stockholm.

International Preliminary Examining Authority, "International Preliminary Report on Patentability" for International Application No. PCT/SE2010/050704, including Applicant's Apr. 21, 2012 Response to the Written Opinion, dated Oct. 9, 2012, 15 pages, Swedish Patent and Registration Office, Stockholm.

European Patent Office, Extended European Search Report for Application No. 10853762.2, Nov. 17, 2016, 8 pages, Sweden.

Su, Zhou, et al, "Replication Algorithms to Retrieve Scalable Streaming Media over Content Delivery Networks", ACM, Nov. 7, 2003, pp. 255-261, New York USA, XP040175145.

Dagiuklas, A F, et al, "Priority Queueing Disciplines in ATM Switches Carrying Two Layer Video Traffic", Jan. 1, 1993, 6 pages, XP006519296.

Dagiuklas, A.F., et al, "Priority Mechanisms in ATM Switches Carrying Two Layer Video Data", Feb. 4, 1993, pp. 273-274, Electronics Letters, lee Stevenage, GB, vol. 29, No. 3, XP000336788.

* cited by examiner

METHOD AND ARRANGEMENT FOR RECORDING A MEDIA STREAM

CROSS REFERENCE TO RELATED APPLICATIONS

This application is a national stage application, filed under 35 U.S.C. §371, of International Application No. PCT/SE2010/050705, filed Jun. 21, 2010, the contents of which are hereby incorporated by reference in its entirety.

BACKGROUND OF THE INVENTION

Related Field

The present invention relates to the field of recording digital media such as video or audio, where compression is used to reduce the amount of data to save onto a data storage. In particular the invention relates to recording digital media, wherein the memory area required to store the digital media is unknown. This could e.g. be a media stream comprising an unknown number of media frames or a media stream with unknown content. The invention also relates to a corresponding media recorder and computer program product for recording streamed digital media.

Description of Related Art

When recording digital streamed media the recording time and thereby the size of the recorded media, is often not known beforehand. One example is a helicopter, having a video or infrared camera, recording digital media during a mission. In such an application the flight time may be unknown. Therefore, it is not possible to beforehand determine the size of the memory or other data storage required to store the recorded data.

In a state of the art real time video compression system, one cannot go back and recompress a frame with a different target rate afterwards. Each frame passes the video compressor only one time and the compression rate needs to be specified beforehand. Therefore, one often has to compromise between bitrate, i.e. quality, and the risk of memory overflow. There is also a risk that an unnecessarily large memory is chosen, in order to avoid the risk of memory overflow. This is a problem, because a data storage such as a memory is often a costly component in digital video recorders. Therefore, it is not desired to have larger memory capacity, i.e. make it more expensive, than it has to.

In order to avoid memory overflow, it is common to have a required minimum recording time in digital video recorders. The traditional way to fulfil this requirement is by using a video compression algorithm in a Constant Bitrate (CB) mode. This entails that the maximum bitrate is known, and therefore it is possible to dimension the data storage to ensure that it's capacity is big enough for the required minimum time. The required minimum recording time, normally comes from the defined maximum mission time for the actual craft/crew. In reality, the majority of the missions will however not be near as long as the defined maximum mission time. This means that for the majority of the missions only a part of the available memory capacity will be used, which implies that video could have been stored with higher bitrate i.e. better quality, than it was. The difficulty is to know the mission length before the mission is started, which is impossible.

In some applications there may also be several media inputs, sharing one memory. In such a case, the available memory is dependent on the number of active sensors during flight time, which may also not be known beforehand. A helicopter may comprise one video camera and one IR camera. In many occasions only one camera is used. However, during flight the crew may choose to activate a second camera. As this will not be known beforehand, an unnecessarily low bitrate will be used in order to leave space for a possible second media input. However, this implies that in many applications an unnecessarily low bitrate is used for recording, even when there is a lot of free memory space when the recording is finalised.

Similar problems may occur in any application comprising a media recorder wherein the recording length or the size of the encoded data is not known beforehand, e.g. in a video camera an audio recorder, a mobile phone or in a surveillance camera.

Considering the mentioned drawbacks with current technology, finding a way to optimize the usage of the memory in a digital media recorder, would be most welcome.

BRIEF SUMMARY

It is an object of the present invention to offer a recording system without an upper limit for recording time, wherein the least prioritized characteristic of the media is sacrificed when memory space is full. The characteristic could be any aspect of the media such as the sound or colour of a recorded video.

The invention adresses the problem of not being able to know the required recording length beforehand. The idea is to set up an encoder algorithm, of an encoder supporting encoding of media into encoded frames comprising a number of sets of data, in a compression mode with a target quality that is near visually lossless, and to utilise a variable number of sets of data. The sets of data may represent different characteristics of the media such as quality, region of interest or colour components.

According to the invention the different characteristics are assigned different priority, dependent on the requirements defined. The priority of the different characteristics may differ between applications and situations. When recording is started all sets of data of each frame are stored until the memory is full. If the memory becomes full, but recording is required to continue, then the least prioritized characteristic or characteristics are sacrificed by discarding the set or sets of data representing the least prioritized characteristic or characteristics of the already recorded frames.

By the use of prioritised data sets, the media recorder according to the present invention ensures that the data storage is used in the most optimal way, which in turn ensures the best possible result is achieved according to the user's prioritations, for the actual time recorded.

In more particular the invention relates to a method for recording a first digital media stream, comprising a number of media frames, in a data storage, comprising the following steps:

encoding each media frame of the first digital media stream into an encoded frame comprising a first number of sets of data, wherein each set of data represents at least one of several different characteristics of the media frame, wherein the different characteristics are assigned different priority,     detecting if the data storage is full     if the data storage is not full, for each encoded frame storing all the first number of sets of data in the data storage, and if the data storage is full, for each encoded frame, storing a second number of sets of data of data in one or more areas in the data storage, occupied by the sets of data representing the lowest prioritized characteristics of the stored encoded frames.

According to one aspect of the invention, the data sets are quality layers representing successive quality refinements of the media frame and the layer assigned the lowest priority is the quality layer representing the highest resolution of the stored encoded frames.

According to one aspect of the invention, the second number of sets of data is equal or less than the number of sets of data of the stored encoded frames having the least number of sets of data.

According to one aspect of the invention, the method further comprises the step of:
setting up an encoder for encoding the media frames into encoded frames in a compression mode.

According to one aspect of the invention, the compression mode is constant quality with a target quality that is lossless.

According to one aspect of the invention, the method further comprises the steps:
receiving a second digital media stream.
encoding each media frame of the second digital media stream into an encoded frame comprising a third number of sets of data, representing successive quality refinements of the media frame and
if the data storage is not full, for each encoded frame, storing all the third number of sets of data in the data storage, and
if the data storage is full, for each encoded frame, storing a fourth number of sets of data for each encoded frame of the second media stream, in one or more areas in the data storage occupied by sets of data representing the lowest prioritized characteristics of the stored encoded frames of one or both of the encoded digital media streams.

According to one aspect of the invention, data storage is a memory and the method further comprises the step of:
storing the quality layers of the same priority on adjacent memory addresses.

According to one aspect of the invention, the method further comprises the step:
if the data storage is full, for each encoded frame storing a second number of sets of data in an area in the data storage previously occupied by two or more sets of data representing the least prioritised characteristics of the stored encoded frames.

The invention also relates to a media recorder for recording a first digital stream comprising an unknown number of media frames comprising:
a first encoder adapted to encode each media frame of the first digital stream into an encoded frame, the encoded frame comprising a first number of sets of data, wherein each set of data represents one of several different characteristics of the media frame, wherein the different characteristics are assigned different priority,
a data interface adapted to interface a data storage for storing the encoded frames,
a controller having
  i. means for detecting if the data storage is full
  ii. means for storing all the first number of sets of data for each encoded frame, if the data storage is not full, and
  iii. means for storing a second number of sets of data for each encoded frame, in a one or more areas occupied by the set representing the least prioritized characteristic of the stored encoded frames, if the data storage is full.

According to one aspect of the invention, at least one of the different characteristics represents a portion of the media frame.

According to one aspect of the invention, at least one of the different characteristics represents colour.

According to one aspect of the invention, at least one of the different characteristics represents sound.

According to one aspect of the invention, at least one set of data represent resolution.

According to one aspect of the invention, the sets of data are progression layers as defined by JPEG2000.

According to one aspect of the invention, the sets of data are quality layers representing successive quality refinements of the media frame and wherein the set of data assigned the lowest prioritized aspects is the quality layer representing the highest resolution of the stored encoded frames.

According to one aspect of the invention, the second number of sets of data is equal or less than the number of sets of data of the stored encoded frames currently having the least number of sets of data.

According to one aspect of the invention, the first encoder is adapted to be set up in one of several different compression modes.

According to one aspect of the invention, one compression mode is constant quality with a target quality that is lossless.

According to one aspect of the invention, the first encoder is adapted to encode the second digital media stream into a third number of frames.

According to one aspect of the invention, the media recorder further comprises a second encoder adapted to encode the second digital media stream into a third number of frames.

According to one aspect of the invention, the controller further comprises:
  iv. means for storing all the third number of sets of data for each encoded frame, if the data storage is not full, and
  v. means for storing a fourth number of sets of data, for each encoded frame of the second media stream, in a one or more areas occupied by the sets of data representing the least prioritized characteristic of the stored encoded frames of one or both of the encoded digital media streams, if the data storage is full.

According to one aspect of the invention, the data storage is a memory and the media recorder further comprises:
means for storing the sets of data of same priority on adjacent memory addresses.

According to one aspect of the invention, the media recorder further comprises,
means for, if the data storage is full, storing a second number of sets of data for each encoded frame, in a data storage area previously occupied by two or more sets of data representing the least prioritised characteristics of the stored encoded frames.

According to one aspect of the invention, the media is video. According to another aspect of the invention, the media is audio.

Another aspect of the invention relates to a computer program product having a computer readable medium thereon including programmed instructions that when executed on a computer causes the computer to perform the method described above.

An advantage of the media recorder according to the invention is that the user always gets the best possible quality on the recorded media.

A further advantage is that memory size can be selected on the "most common" usage scenario rather than the worst case usage scenario. This in turn can lower unit cost.

A further advantage is that there is no longer an upper limit for recording time. Even with a very small memory you will be able to record a very long segment of time.

A further advantage is that a media recorder and a method for handling a memory shared by several sensors, is provided.

BRIEF DESCRIPTION OF THE FIGURES

Further objects and features, of the present invention will appear from the following detailed description of aspects of the invention, wherein the aspects will be described in more detail with reference to the accompanying drawings, in which.

It should be added that the following description of the aspects is for illustrative purposes only and should not be interpreted as limiting the invention exclusively to these aspects.

DETAILED DESCRIPTION OF VARIOUS EMBODIMENTS

The illustrations of present invention relate, in general, to the field of video cameras. However, the invention could be implemented in any device where media compression is used to reduce the amount of data to save onto a data storage.

Aspects of the present invention will be described more fully hereinafter with reference to the accompanying drawings, in which different aspects of the invention are shown. This invention may, however, be embodied in many different forms and should not be construed as limited to the aspects set forth herein. Rather, these aspects are provided so that this disclosure will be thorough and complete, and will fully convey the scope of the invention to those skilled in the art. Like reference signs refer to like elements throughout.

The concept of dividing media frames by separating the information about different characteristics of the media into different sets of data is illustrated in FIGS. 1-2. If the media is a video, such characteristics may be colour, position, light, resolution, sound etc. The sets of data may be independent, i.e. they can be decoded one by one, independently on each other, in any order. Each set of data contains one characteristic adding one aspect to the media.

The sets of data may also be dependent on each other, which implies that the sets are layers that has a defined mutual order.

Figure 1A:
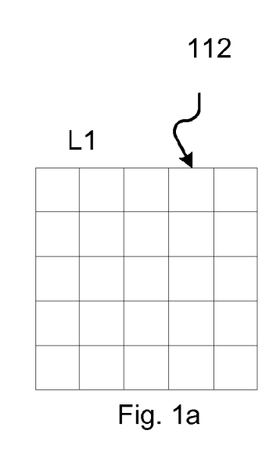
FIG. 1 illustrates the concept of dividing an image into sets of data.
Figure 1B:
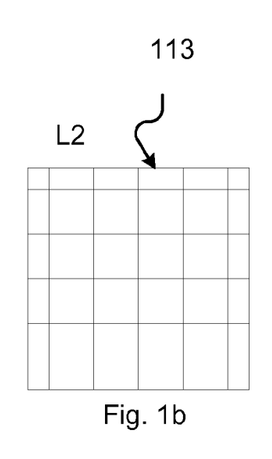
Figure 1C:
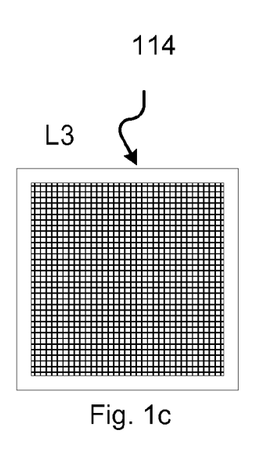
Figure 1D:
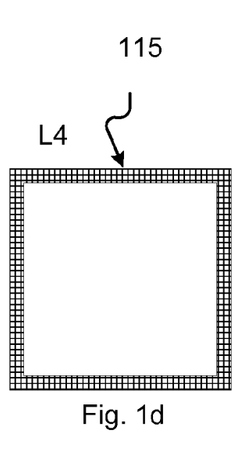
Figure 1E:
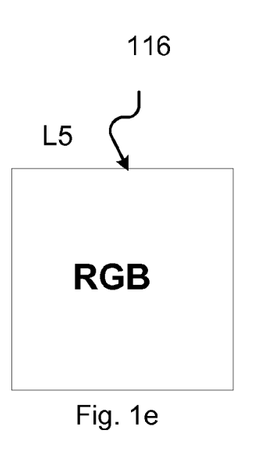

FIG. 1a-1e illustrates an image, wherein the data representing different characteristics of the image are separated into different sets of data. FIG. 1a illustrates the first set of data (D1) 112. In this illustration the first set of data contains pixel information representing the lowest resolution of the whole image. FIG. 1b illustrates the second set of data (D2) 113, comprising complementary pixel information of the whole image, which when combined with (D1) represents an image with higher resolution than D1 alone. FIG. 1c represents the third set of data (D3) 114 comprising additional information about the center portion of the image. FIG. 1d illustrates the fourth set of data (D4) 115 comprising additional information about the peripheral portion of the image. Finally the fifth set of data (D5) 116 comprises the colour information.

Figure 2A:
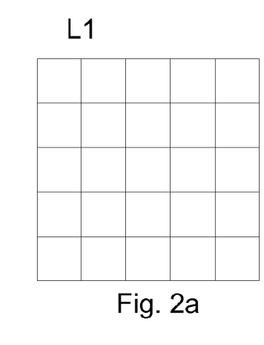
FIG. 2 illustrates progressive refinements of an image decoded using sets of data.
Figure 2B:
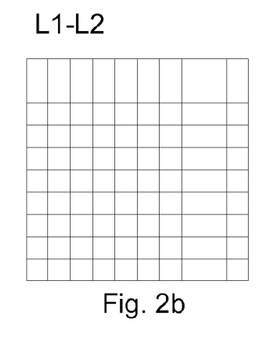
Figure 2C:
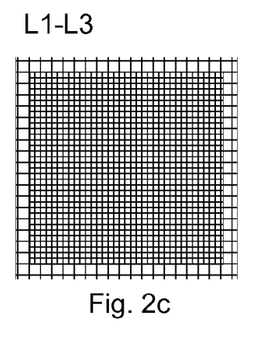
Figure 2D:
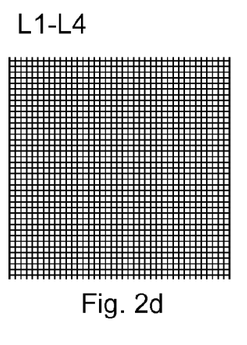
Figure 2E:
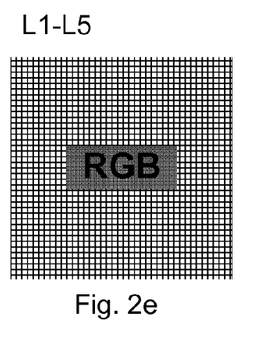

FIG. 2a-2e illustrates the result when decoding an image using different numbers of sets of data. By utilizing a variable number of the sets of data, different refinements of the image are achieved. FIG. 2a illustrates an image decoded utilizing only the first set of data i.e. D1. The result is an image with very low resolution. Still a complete image is obtained. FIG. 2b illustrates the result when the image is decoded using two sets of data, set of data D1 and D2. By using two sets of data comprising complementary pixel information, more resolution information is added and the resolution of the decoded image is increased. In FIG. 2c the image is encoded utilizing three sets of data, sets of data D1-D3. As the third set of data, i.e. D3, contains additional information about the center portion of the image, the resolution in the center of this image will then be increased, while the resolution of the peripheral portion will be the same as when only using sets of data D1 and D2. FIG. 2d illustrates an image decoded using four sets of data, set of data D1-D4. Set of data D4 comprises additional information about the peripheral portion of the image. Hence, the image decoded using sets of data D1-D4 has large visually lossless resolution, but no colour. Finally FIG. 2e illustrates a losslessly encoded image, i.e. an image decoded using all five sets of data D1-D5. The image has colour and large resolution.

If the media is video, the audio data may also represent one or more sets of data. In the example illustrated in FIGS. 1-2 the audio component could e.g. be an additional set of data D6. Note that these examples are for illustrative purposes only. Different characteristics of the media may be arranged in any way in the sets of data. There may also be several sets of data representing the same aspect of the media. There may e.g. be several sets of data representing colour or resolution of an image.

According to one aspect of the invention the sets of data may be combined in any way. Hence the image may then be decoded using sets of data D1 and D3. Then an image with low resolution at the border but high resolution at the center portion is then achieved.

Sets of data may also be created using a progressive encoding algorithm, which implies that data is compressed in multiple passes or layers of progressively higher detail, having a defined mutual order, i.e. the layers have to be added in a predefined order to achieve successive refinements of the media. A compression algorithm supporting progressive layers is JPEG2000. JPEG2000 is a commonly known video compression standard and will therefore not be described in detail in this application. However, this invention is not limited to the use of JPEG2000. Any method of dividing media information into layers representing different characteristics of the media could be used.

Figure 3A:
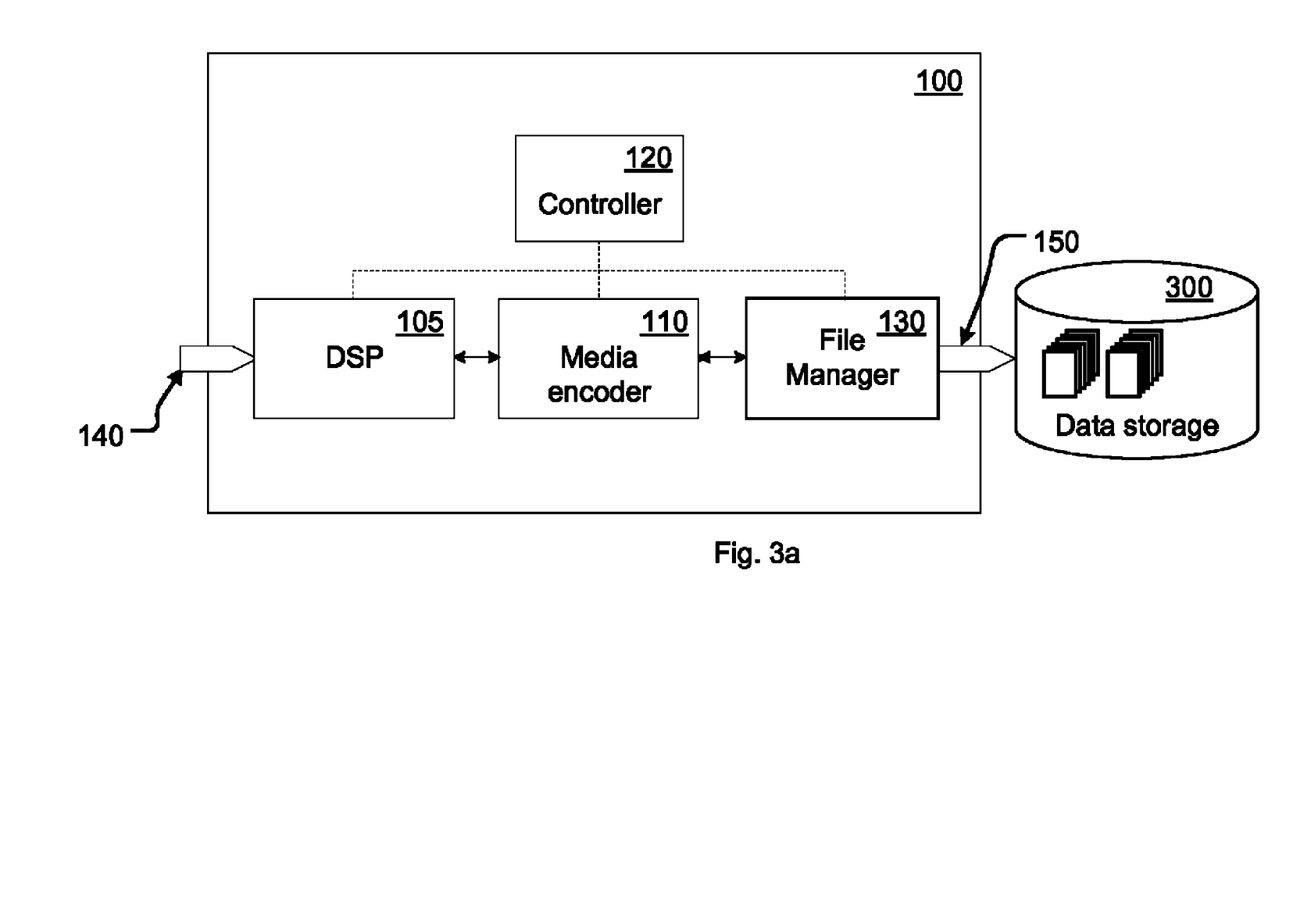
FIG. 3 schematically illustrates a digital media recorder.
Figure 3B:
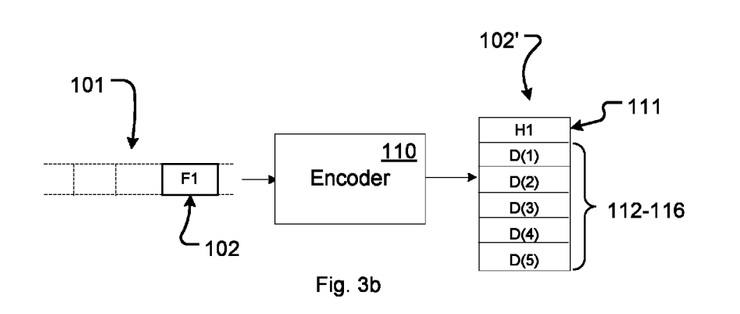
Figure 3C:
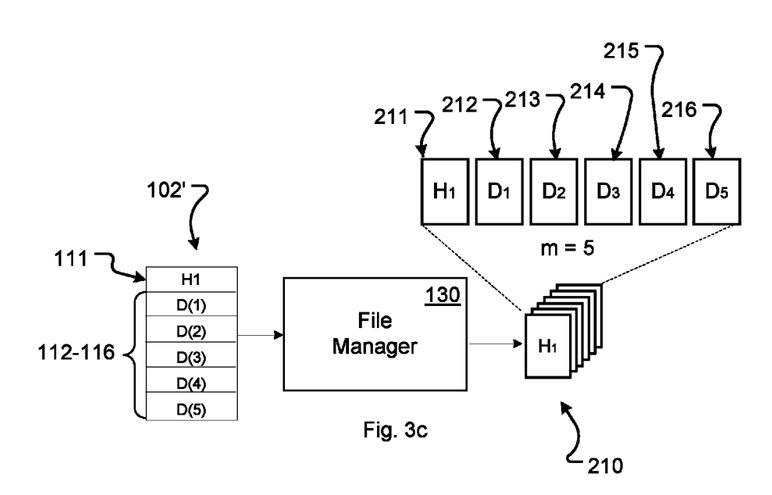

FIG. 3a illustrates a digital media recorder 100 for receiving and compressing a digital media stream, such as a video or audio stream, and a data storage 300 for storing the compressed data. The digital media recorder 100 comprises an Image Signal Processor (ISP), a media encoder 110, a controller 120, a file manager 130, a data input 140 and a data storage interface 150. FIG. 3b illustrates the media encoder 110 in more detail. FIG. 3c illustrates the file manager 130 in more detail. The media recorder is now described with reference to FIGS. 3a to 3c.

The data input 140 is a port for connecting one or several external sensors such as camera or audio sensors. The data input receives a digital media stream 101 comprising raw media data. The data input 140 is connected to a DSP 105, or other image processor, adapted to process the received media stream. The DSP 105 typically performs media enhancement such as image tuning or equalising.

The media encoder 110 is adapted to encode a media frame 102 into an encoded frame 102' divided into several sets of data, see FIG. 3b. A media frame refers to fixed sized data blocks within the digital media stream. A media frame in a video stream is typically an image. The encoded frame 102' comprises a header (H) 111 and five sets of data (D) 112-116, as explained in the description of FIG. 1. The sets of data (D) 112-116 represent different characteristics of the complete media frame 102. Hence, each encoded frame 102' may be decoded only using data from one set of data. Each set of data is assigned an order of priority, which may vary dependent on the requirements of the present situation. The most prioritised characteristics is represented by set of data D1 and the least prioritised characteristic is represented by set of data D5. The prioritations may differ between applications and situations. If only one set of data is used for decoding, the refinement of the decoded media will be very low. In this example the number of sets of data (D) is five. However, the number of sets generated by the encoder may be specified by the user.

The controller 120 comprises means for controlling the operation of the media recorder 100 as described in FIGS. 4-8. The controller comprises e.g. means for detecting if the data storage 300 is full.

A file system is a structure for storing and organizing computer files and the data they contain to make it easy to find and access them. The media recorder 100 uses a file manager 130 for organizing the data in a file system. The organized files are stored in the data storage 300. Each encoded frame 102' is organized in a set of files 210 by the file manager 130. FIG. 3c illustrates the file manager 130 storing encoded frame 102' stored in a set of files 210. The set of files includes one file containing the header (H) 211 of the encoded media frame and five files containing sets of data (D) 212-216. File 212 represent the highest prioritized information and 216 the lowest prioritized information of the encoded frame. The size of the sets of data (D) 212-216 may vary depending on the complexity of the media. A black image may e.g. be encoded using very few bits. The size of the different sets of data may also differ. Hence all five sets of data (D) 212-216 may have different contribution to the decoding of the media. The size and content of each set of data may be defined by the user. As an example a losslessly encoded Full HD image may e.g. be about 2 Mbyte. If using five sets of data each set of data may be in the range 500-1000 Kbyte and the header about 1-2 Kbyte Using a file system is one way of organizing the encoded frames in the memory. The sets of data (D) 112-116 may also be organized in the data storage 300 using another implementation for handling memory allocation e.g. a hardware or software implemented memory manager.

The media recorder also comprises a data storage interface 150 for interfacing a data storage 300, such as a memory bus. The data storage 300 may be internal in the media recorder or external e.g. a memory card or located outside the media recorder 100.

The data storage 300 is the final storage for the files representing the encoded frames 102'. In a digital video recorder in a helicopter, the data storage 300 may be a memory 300 such as solid statedrive (SSD), due to that vibrations caused by the helicopter may influence the performance of a data storage having moving parts. However, any digital data storage device may be used for the invention if suitable for the intended application.

When the media recorder 100 records a digital media stream, digital raw data is received at the data input 140. The raw data is then passed through the media path comprising the DSP 105 and the media encoder 110. If the recorder records several parallel media streams, the recorder comprises several parallel media paths. The processed and compressed media is finally organised by the file manager 130 and transferred to the data storage 300 via the data storage interface 150.

The media recorder 100 in FIG. 3a-3c is only an illustration of the operation of a media recorder and is not significant to the invention. The blocks of the media recorder may be arranged differently. The DSP and the media encoder may e.g. be integrated within the sensor module.

The operation of the media recorder storing media files in a data storage, will now be described in more detail with reference to FIG. 4-6.

Figure 4:
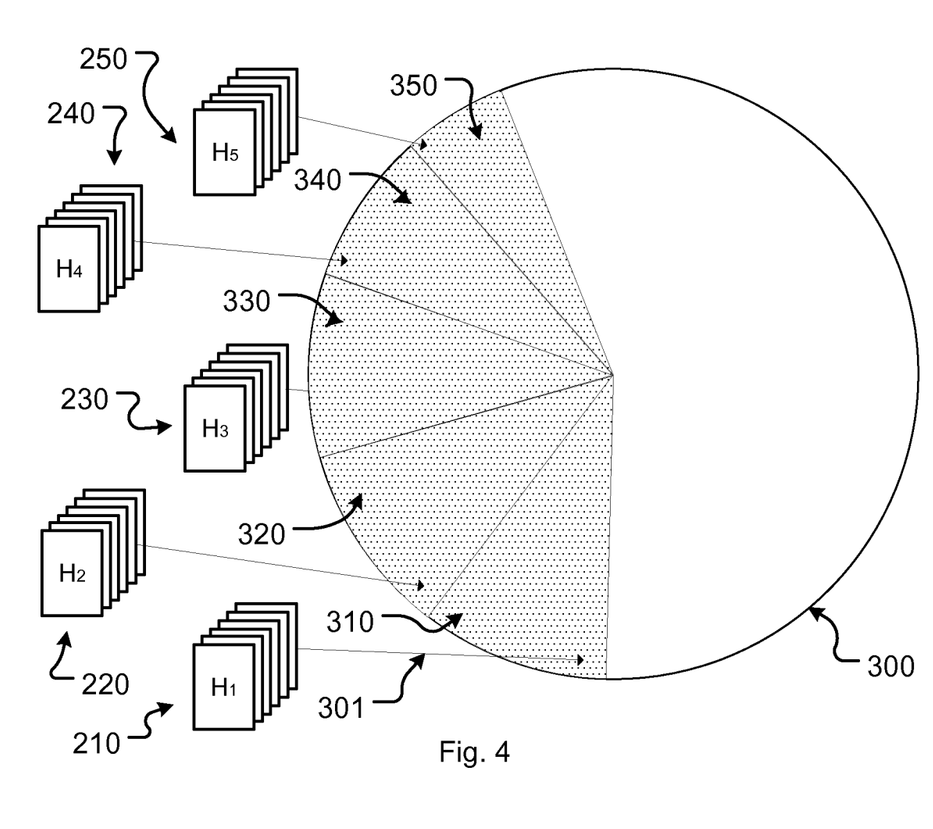
FIG. 4 schematically illustrates storing encoded media in a memory.

FIG. 4 illustrates how the files are stored in the memory 300. In FIG. 4b the media recorder has started to record a digital media stream. Five sets of data of files 210, 220, 230, 240, 250, corresponding to five media frames, have been recorded. Each encoded frame contains one header (H) and five sets of data (D). Each set of files is related to a memory pointer 301 pointing to a memory area 310, 320, 330, 340, 350, in the memory 300, wherein the data is stored.

Figure 5:
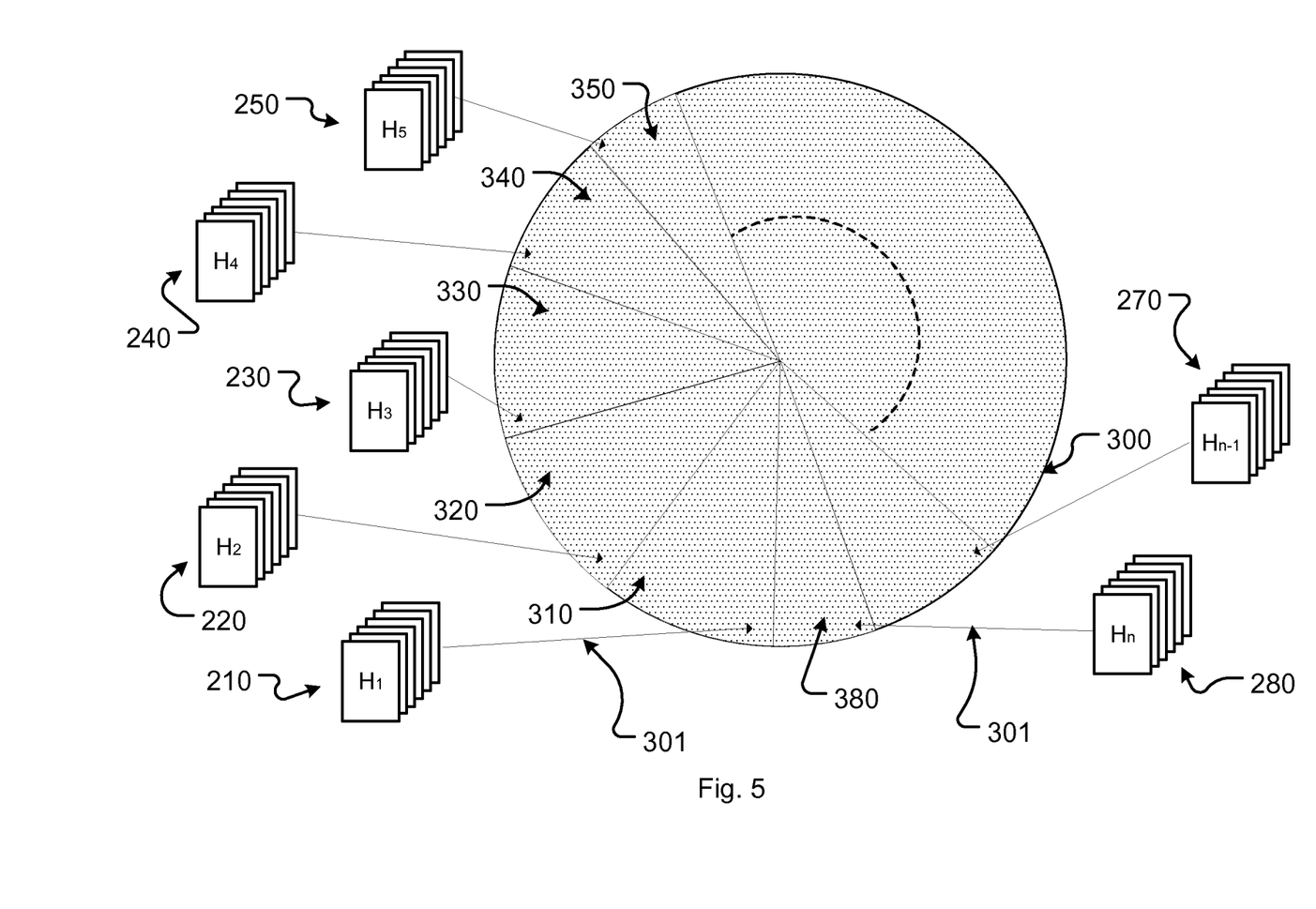
FIG. 5 schematically illustrates storing encoded media in a memory until the memory is full.

In FIG. 5 the media recorder 100 has recorded n sets of data of media files corresponding to n media frames. When the $n^{th}$ set of files 280 corresponding to media frame n is stored in memory area 380, the memory 300 is full.

Figure 6:
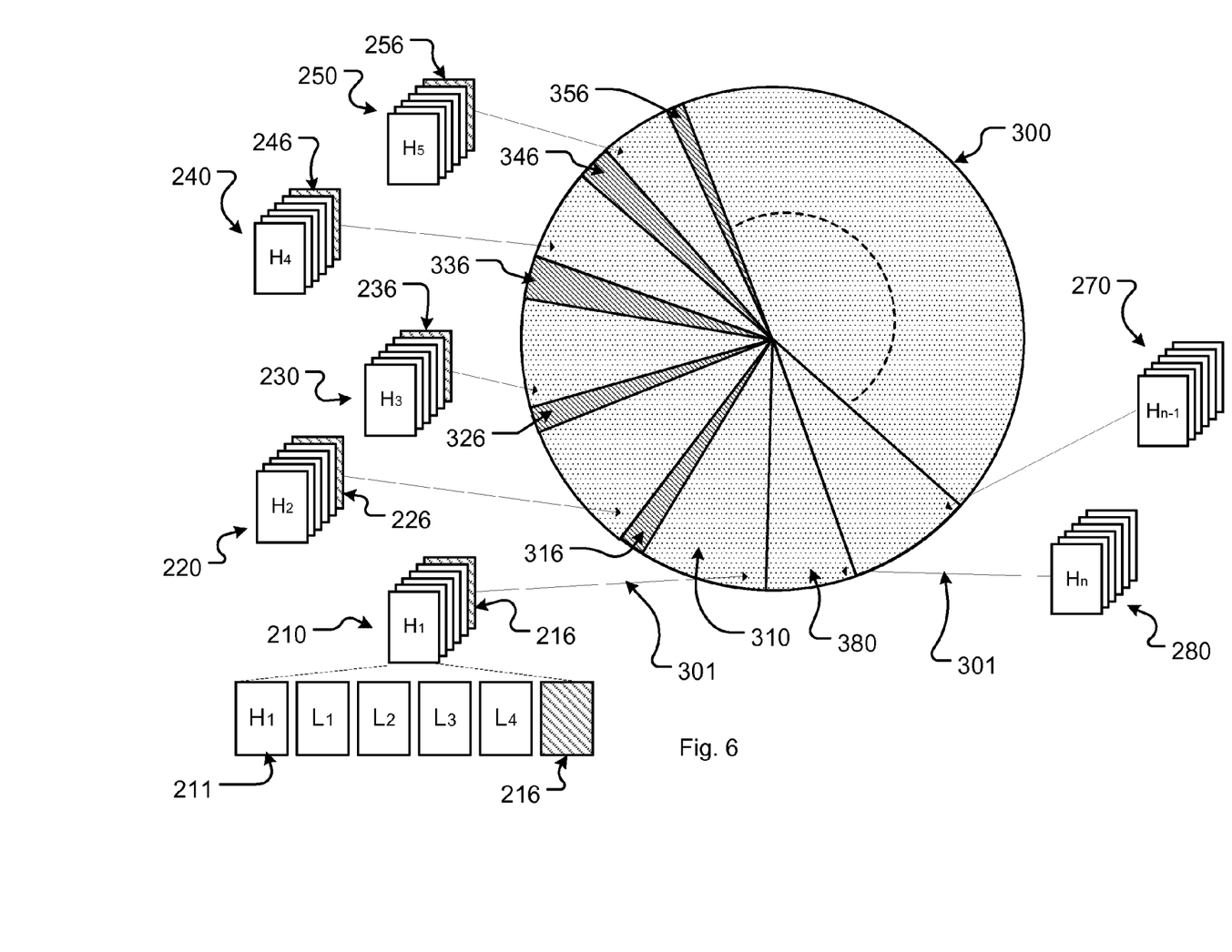
FIG. 6 schematically illustrates discarding some previously recorded media, when the memory is full.

FIG. 6 illustrates that the media recorder 100 is adapted to free up memory space for new frames. When the memory 300 is full, some of the already stored data needs to be discarded. This can be done by deleting the discarded data or by simply overwriting the discarded data. The media recorder 100 discards the least prioritized set of data (D5) 216, 226, 336, 346, 356. The number of frames wherein one set of data needs to be discarded may be fixed or calculated e.g. based on knowledge about the media stream. The number of frames should at least be big enough to ensure that the space made available fits at least one compressed frame. The user of the media recorder can also select to delete more than one set of data in each previously stored encoded frame.

When the least prioritised sets of data (D) of frames 210, 220, 230, 240, 250 are deleted free, memory space becomes available 310, 320, 330, 340, 350. The memory made available will be fragmented. However, the organization of the memory will be handled by the file system. Note that this embodiment is for illustrative purposes only, and that the memory allocation is normally more advanced in reality. The memory usage in a file system is not as simple as appears from the figures, but rather more complex. FIG. 6 illustrates the principle for freeing up memory.

Figure 7:
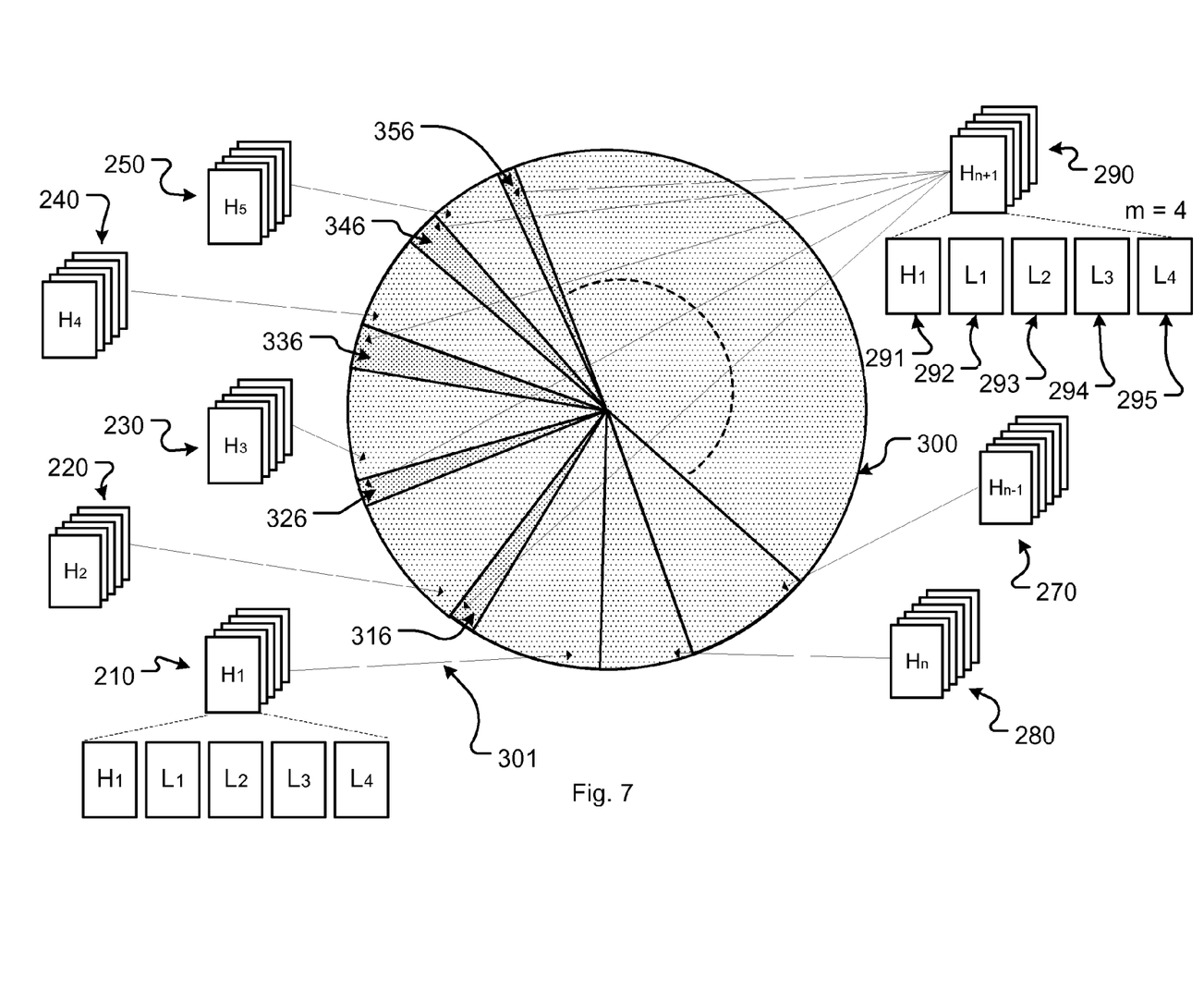
FIG. 7 schematically illustrates how to store new frames, when the memory is full.

FIG. 7 discloses that the media recorder 100 is adapted to store a set of files 290, representing a new media frame 290, in the memory spaces denoted 316, 326, 336, 346, 356 previously occupied by the least prioritized set of data of previously recorded media frames 210, 220, 230, 240 and 250. These frames now only contain four sets of data (D). For the coming frames a header (H) 291 and only four sets of data (D) 292, 293, 294 and 295 are stored (m=4). Hence, as new frames are recorded the refinement of the media data recorded in the memory 300 will gradually decrease. When the fifth set of data is deleted for all frames in the memory, the recorder will start discarding the fourth set of data of already stored frames, and so on. At last only one set of data will remain. By setting the size of the lowest set of data, i.e. the set of data representing the most prioritized characteristics, to a very low value, a virtually endless recording time will be achieved. Hence, as long as there is memory left a virtually lossless coding, i.e. best possible refinement is used. When the disk gets full, a gradual decrease in the refinement of the complete media is obtained, as long as the recording continues. By discarding previously recorded data when the memory is full, memory overflow is avoided.

Figure 8:
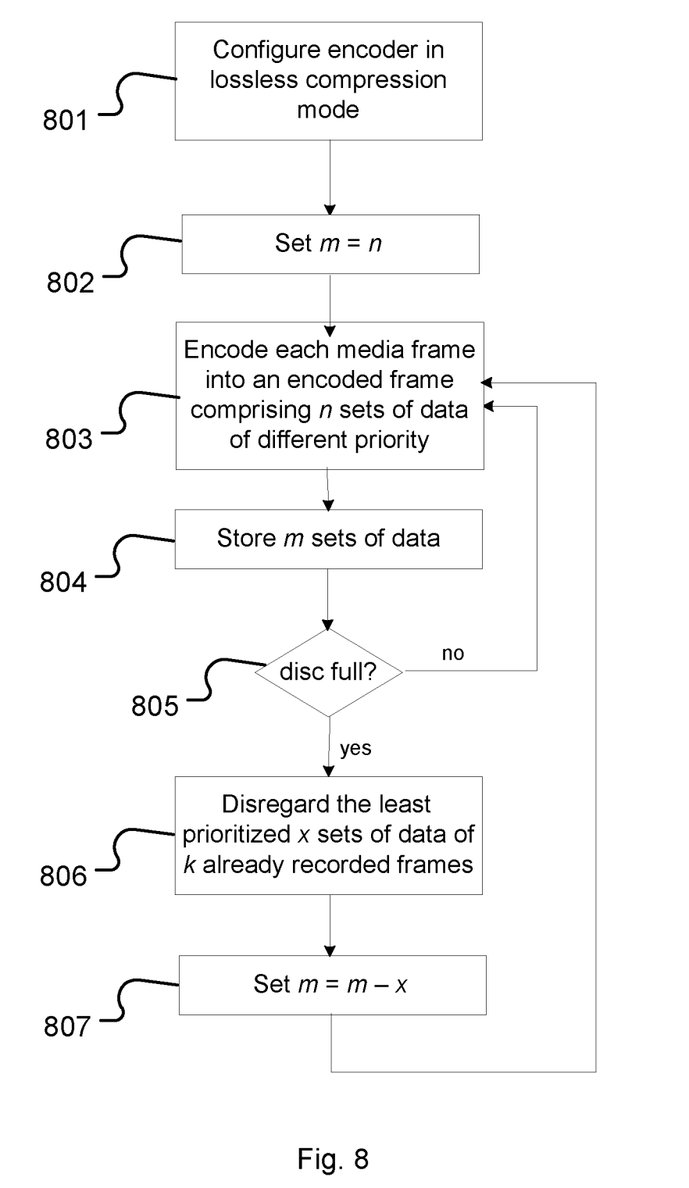
FIG. 8 is a flowchart describing recording digital streamed media.

FIG. 8 illustrates the method of recording streamed media in a flowchart. In the first step 801, the media encoder 110 is configured in a compression mode with a target that is near visually lossless, corresponding to n sets of data (D). The variable n indicates the number of sets of data generated by the encoder. In the next step 802 the media recorder is configured to initially store all n sets of data. The variable m indicates how many of the generated sets of data should be stored in the memory 300.

In step 803 the media recorder starts encoding the digital media stream 101. Each media frame is encoded into an encoded frame comprising n sets of data. In step 804 m out of n sets of data are stored in the memory 300. After encoding the encoded data a check 805 is done to find out if the memory is full. If the memory is not full, the decoding continues according to step 803.

If the memory is full, memory space needs to be freed. This is done in step 806 by discarding the upmost x set/sets of data of the first k no of recorded frames. The variable x indicates the number of sets of data to discard in each previously recorded frame and the variable k indicates the number of frames to discard, where k and x could be selected from case to case, but should at least be selected big enough so that the space made available at least fits one compressed frame. The number of sets of data to discard could be one ore several. When memory is freed up the variable m, corresponding to how many of the sets of data should be stored, is set to m−x. Hence, coming sets of data are stored with no more sets of data than the frames that presently has least sets of data in the memory. After this step encoding continues according to step 803 until the memory is full again.

FIGS. 9 and 10 illustrate a progressively recorded video stream, wherein quality is reduced when the data storage is full. The media frame is encoded into five sets of data representing different characteristics of the media, wherein the characteristics are quality layers. FIG. 9 illustrates the concept of quality layers, representing different resolution refinements of the media. The check pattern in FIGS. 9 and 10 illustrates the pixels of the frame. Hence, many squares symbolize many pixels. FIG. 9a illustrates layer one (D1) 112, i.e. the layer representing the lowest resolution of the image. FIG. 9b illustrates layer two (D2) 113, i.e. the layer representing the second lowest resolution of the image and so on. FIG. 9e represents the highest resolution of the image.

Figure 9A:
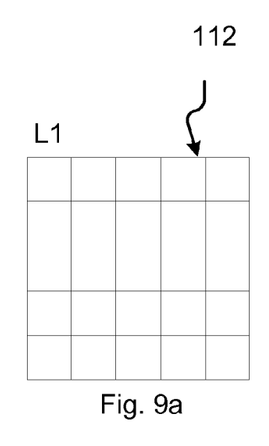
FIG. 9 illustrates an image divided into five quality layers.
Figure 9B:
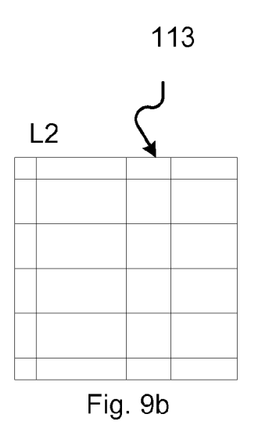
Figure 9C:
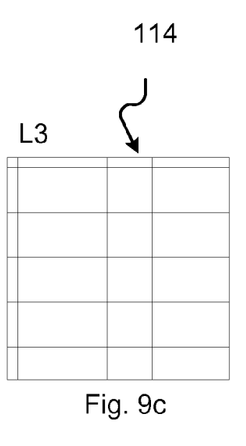
Figure 9D:
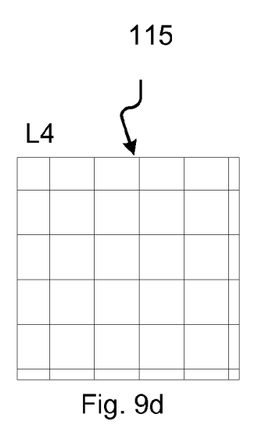
Figure 9E:
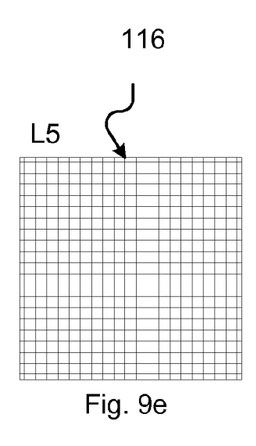
Figure 10A:
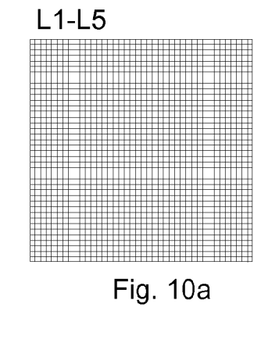
FIG. 10 illustrates an image decoded using different number of quality layers.
Figure 10B:
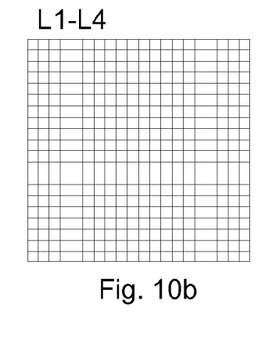
Figure 10C:
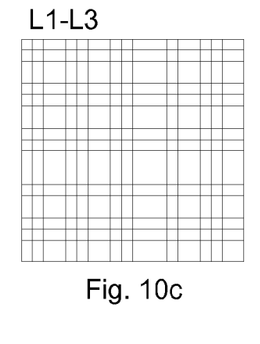
Figure 10D:
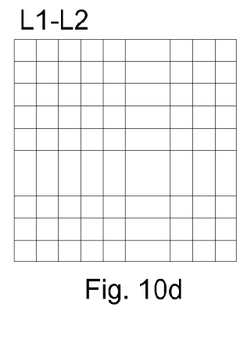
Figure 10E:
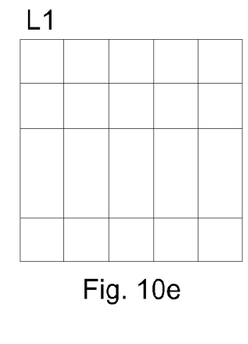

FIG. 10 illustrates the result when decoding an image using different number of layers, when recording data according to the method described in FIG. 8. As long as the memory is not full, i.e. the answer to step 805 is no, all quality layers of the encoded frame are stored. Hence, the frame will be recorded using all five quality layers. The resolution of the media when decoded will then be maximal or visually lossless; this is illustrated in FIG. 10a. When the memory 300 is full, layer five (D5), i.e. the quality layer representing the highest resolution of the frame is discarded, as described in step 806. The recorded media will then only have four quality layers (D1-D4). The result is an image with less resolution, as illustrated in FIG. 9b. As the recording continues and all the memory previously allocated by layer five (D5) overwritten or erased, the recorder will start discarding the data in layer four (D4). The recorded media will then have only three quality layers. The result when decoding the media is an image with even less resolution, as illustrated in FIG. 9c. As recording continues, the quality will be decreased successively by sacrificing one quality layer at the time. The result is illustrated in the FIGS. 10a-10e. The refinement will decrease and the distortion will increase progressively with each layer removed. By setting the size of the lowest layer, i.e. the layer representing the most prioritized characteristics, to a very low value, a virtually endless recording time will be achieved.

According to one aspect of the invention sets of data representing the same characteristic of different media frames are stored in one part of the data storage, such as on adjacent memory addresses. For example, in an application using two sets of data, all files containing the first set of data are stored in a first area; all files containing the second set of data are stored in a second area, wherein the first area is located next to the first area. Thereby, the first files in the second area will be overwritten when the first area is full. Thereby, new frames of the second set of data, representing the higher refinement, will be stored on an address pointing outside the memory, i.e. these frames are discarded. Hence, an efficient implementation of the invention can be done by organizing the data this way.

In one aspect of the invention the media recorder has two or more media inputs sharing one data storage. In such a case, the available memory for each media stream, is dependent on the number of active inputs. The recorder may contain several encoders, e.g one audio encoder and one video encoder. The operation will follow the same principle of deleting the least prioritised data of previously stored frames, when the data storage is full. Hence, each encoder will initially be set up in a compression mode. The compression mode is e.g. constant quality with a target that is visually lossless. As long as the data storage is not full, all the sets of data of both encoders will be stored in the data storage. When the data storage becomes full the sets of data representing the highest refinement of one or both media streams will be discarded. In a mission where all inputs are active, the data storage will be shared between the media streams from the different inputs. However, if only one input, e.g. the sonar in a submarine, is active, full quality will almost always be obtained.

In a recorder having several inputs the data of the different inputs may be treated differently, when the memory is full. One media stream may e.g. be considered more important or more sensitive to distortion. The user may choose to keep all sets of data for that media stream, wherein the other media streams are sacrificed. The setup of the different media streams of the recorder may vary from time to time.

According to one aspect of the invention it may also be possible for the user to control the data, such that parts of the data is protected from the degradation caused by discarding sets of data. During flight the crew may e.g. note an event of particular interest. The crew may then choose to protect one part of the recorded data from degradation caused by the discarding of sets of data, that will take place if the data storage becomes full. Protection can be done by some kind of marker or write protection.

The foregoing has described the principles, preferred aspects and modes of operation of the present invention. However, the invention should be regarded as illustrative rather than restrictive, and not as being limited to the particular aspects discussed above. The different features of the various aspects of the invention can be combined in other combinations than those explicitly described. It should therefore be appreciated that variations may be made in those aspects by those skilled in the art without departing from the scope of the present invention as defined by the following claims.

The invention claimed is:

1. A method for recording a first digital media stream with an unknown length, comprising a number of media frames, in a data storage, said method comprising the following steps:
   setting up an encoder for encoding the media frames into encoded frames in a compression mode;
   encoding each media frame of the first digital media stream with an unknown length into an encoded frame comprising a first number of sets of data, wherein each set of data represents at least one of several different characteristics of the media frame, wherein the different characteristics are assigned different priority;
   as ongoing recording of the first digital media stream with the unknown length continues, detecting if the data storage is full; and
   if the data storage is not full, for each encoded frame storing all the first number of sets of data in the data storage; and
   if the data storage is full, as the ongoing recording of the first digital media stream with the unknown length continues, for each encoded frame, storing a second number of sets of data in one or more areas in the data storage previously occupied by the sets of data representing the lowest prioritized characteristics of the stored encoded frames, such that during the ongoing recording of the first digital media stream the stored encoded frames are altered but not entirely overwritten so as to preserve an entirety of the length of the first digital media stream for the duration of the recording thereof.

2. The method according to claim 1, wherein at least one of the different characteristics represents a portion of the media frame.

3. The method according to claim 1, wherein the data sets are quality layers representing successive quality refinements of the media frame and wherein the layer assigned the lowest priority is the quality layer representing the highest resolution of the stored encoded frames.

4. The method according to claim 1, wherein the second number of sets of data is equal or less than the number of sets of data of the stored encoded frames having the least number of sets of data.

5. The method according to claim 1, wherein the compression mode is constant quality with a target quality that is lossless.

6. The method according to claim 1, further comprising the steps of:
   receiving a second digital media stream;
   encoding each media frame of the second digital media stream with an unknown length into an encoded frame comprising a third number of sets of data, representing successive quality refinements of the media frame;
   in response to receiving the second digital media stream, as the ongoing recording of at least one of the first digital media stream with the unknown length or the second digital media stream with the unknown length continues, detecting if the data storage is full;
   if the data storage is not full, for each encoded frame of the second digital media stream, storing all the third number of sets of data in the data storage; and
   if the data storage is full, as the ongoing recording of at least one of the first digital media stream with the unknown length or the second digital media stream with the unknown length continues, storing a fourth number of sets of data for each encoded frame of the second media stream, in one or more areas in the data storage occupied by sets of data representing the lowest prioritized characteristics of the stored encoded frames of one or both of the encoded digital media streams, such that during the ongoing recording of at least one of the first digital media stream or the second digital media stream the stored encoded frames for each are altered but not entirely overwritten so as to preserve an entirety of the length of the first digital media stream and the second digital media stream for the duration of the recording thereof.

7. The method according to claim 1, wherein the data storage is a memory and the method further comprises the step of storing the quality layers of the same priority on adjacent memory addresses.

8. The method according to claim 1, wherein the media stream is video.

9. The method according to claim 1, wherein the media stream is audio.

10. A media recorder for recording a first digital stream with an unknown length comprising an unknown number of media frames, said media recorder comprising:
    a first encoder configured to encode each media frame of the first digital stream with an unknown length into an encoded frame, the encoded frame comprising a first number of sets of data, wherein each set of data represents one of several different characteristics of the media frame, wherein the different characteristics are assigned different priority, and wherein the first encoder is adapted to be set up in one of several different compression modes; and
    a data interface configured to interface a data storage for storing the encoded frames;
    a controller configured for detecting if the data storage is full as ongoing recording of the first digital media stream with the unknown length continues;
    wherein the media recorder is configured for:
      if the data storage is not full, storing all the first number of sets of data for each encoded frame; and
      if the data storage is full, as the ongoing recording of the first digital media stream with the unknown length continues, storing a second number of sets of data for each encoded frame in one or more areas in the data storage previously occupied by the sets of data representing the lowest prioritized characteristic of the stored encoded frames, such that during the ongoing recording of the first digital media stream the stored encoded frames are altered but not entirely overwritten so as to preserve an entirety of the length of the first digital media stream for the duration of the recording thereof.

11. The media recorder according to claim 10, wherein at least one of the different characteristics represents a portion of the media frame.

12. The media recorder according to claim 10, wherein the sets of data are quality layers representing successive quality refinements of the media frame and wherein the set of data assigned the lowest prioritized aspects is the quality layer representing the highest resolution of the stored encoded frames.

13. The media recorder according to claim 10, wherein the second number of sets of data is equal or less than the number of sets of data of the stored encoded frames currently having the least number of sets of data.

14. The media recorder according to claim 10, wherein one compression mode is constant quality with a target quality that is lossless.

15. The media recorder according to claim 10, wherein the media recorder is further configured to receive a second digital media stream with an unknown length.

16. The media recorder according to claim 15, wherein the first encoder is further configured to encode the second digital media stream with the unknown length into a third number of frames.

17. The media recorder according to claim 15, further comprising a second encoder further configured to encode the second digital media stream with the unknown length into a third number of frames.

18. The media recorder according to claim 16, wherein the media recorder is further configured for:
storing all the third number of sets of data for each encoded frame, if the data storage is not full, and
if the data storage is full, as the ongoing recording of the first digital media stream with the unknown length continues, storing a fourth number of sets of data, for each encoded frame of the second media stream, in a one or more areas occupied by the sets of data representing the least prioritized characteristic of the stored encoded frames of one or both of the encoded digital media streams, such that during the ongoing recording of at least one of the first digital media stream or the second digital media stream the stored encoded frames for each are altered but not entirely overwritten so as to preserve an entirety of the length of the first digital media stream and the second digital media stream for the duration of the recording thereof.

19. The media recorder according to claim 10, wherein the data storage is a memory and the media recorder further comprises means for storing the sets of data of same priority on adjacent memory addresses.

20. The media recorder according to claim 10, wherein the media stream is video.

21. The media recorder according to claim 10, wherein the media stream is audio.

22. A computer program product having a non-transitory computer readable medium thereon including programmed instructions that when executed on a computer causes the computer to perform the method according to claim 1.

* * * * *